US012614907B2

(12) United States Patent
Kumar et al.

(10) Patent No.: US 12,614,907 B2
(45) Date of Patent: Apr. 28, 2026

(54) OR RELATING TO POWER TRANSMISSION NETWORKS

(71) Applicant: General Electric Technology GmbH, Baden (CH)

(72) Inventors: Amit Kumar, Stafford (GB); Carl Barker, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 416 days.

(21) Appl. No.: 18/252,915

(22) PCT Filed: Nov. 29, 2021

(86) PCT No.: PCT/US2021/083315
§ 371 (c)(1),
(2) Date: May 15, 2023

(87) PCT Pub. No.: WO2022/117489
PCT Pub. Date: Jun. 9, 2022

(65) Prior Publication Data
US 2025/0323504 A1 Oct. 16, 2025

(30) Foreign Application Priority Data

Dec. 2, 2020 (EP) .................................... 20275178

(51) Int. Cl.
*H02J 3/06* (2006.01)
*H02J 3/38* (2006.01)
*H02J 3/36* (2006.01)

(52) U.S. Cl.
CPC ..................................... *H02J 3/06* (2013.01); *H02J 3/38* (2013.01); *H02J 3/36* (2013.01)

(58) Field of Classification Search
CPC .................. H02J 3/06; H02J 3/38; H02J 3/36
(Continued)

(56) References Cited

U.S. PATENT DOCUMENTS

| | | | | |
|---|---|---|---|---|
| 2009/0182518 | A1* | 7/2009 | Chu | H02J 3/1814 |
| | | | | 702/61 |
| 2011/0140511 | A1* | 6/2011 | Larsen | H02J 3/02 |
| | | | | 307/2 |

(Continued)

FOREIGN PATENT DOCUMENTS

| | | |
|---|---|---|
| CN | 107394819 B | 11/2017 |
| CN | 108923437 B | 11/2018 |

(Continued)

OTHER PUBLICATIONS

International Search Report and Written Opinion for PCT/EP2021/083315, dated Mar. 14, 2022, 16 pages.

(Continued)

*Primary Examiner* — Chun Cao
(74) *Attorney, Agent, or Firm* — Eversheds Sutherland (US) LLP

(57) ABSTRACT

A network interconnection, for interconnecting a power supply network with a number of power distribution networks, including a power converter station that is connected in use adjacent to an end of a power supply network and is controllable to provide an alternating voltage source. The network interconnection also includes an interconnection bus which extends from the power converter station towards a primary point of interconnection that is connected, in use, with a primary power distribution network and at least one secondary point of interconnection which is connected, in use, with a corresponding secondary power distribution network. The network interconnection additionally includes a power regulator that is electrically connected between the interconnection bus and each secondary point of interconnection. The network interconnection further includes a power flow controller that is arranged in operative commu- (Continued)

nication with the power converter station and each power regulator.

13 Claims, 6 Drawing Sheets

(58) Field of Classification Search
USPC ........................................................ 700/286
See application file for complete search history.

(56) References Cited

U.S. PATENT DOCUMENTS

| | | | | |
|---|---|---|---|---|
| 2012/0267955 | A1* | 10/2012 | Zhan | H02J 1/06 |
| | | | | 307/31 |
| 2014/0379157 | A1 | 12/2014 | Das et al. | |
| 2020/0059095 | A1* | 2/2020 | Adamczyk | H04B 3/54 |
| 2021/0083595 | A1* | 3/2021 | Kim | H02M 7/493 |
| 2022/0043041 | A1* | 2/2022 | Guo | H02J 3/38 |

FOREIGN PATENT DOCUMENTS

| | | | | | |
|---|---|---|---|---|---|
| CN | 110034587 A | * | 7/2019 | ............. | H02J 3/06 |
| CN | 111049150 A | * | 4/2020 | ............. | H02J 3/06 |
| CN | 110247416 B | * | 7/2021 | ............. | H02J 3/36 |

OTHER PUBLICATIONS

Imdadullah et al.: 11 A Comprehensive Review 1-15 of Power Flow Controllers in Interconnected Power System Networks 11, IEEE Access, IEEE, USA, vol. 8, Jan. 20, 2020 (Jan. 20, 2020), pp. 18036-18063, XP011769135, DOI: 10.1109/ACCESS.2020. 2968461.

Verboomen et al.: "Phase shifting transformers: principles and applications," 2005 International Conference on Future Power Systems, Amsterdam, Netherlands, 2005, pp. 6 pp. -6, doi: 10.1109/ FPS.2005.204302.

Extended European Search Report for EP20275178.0, dated May 7, 2021, 8 pages.

* cited by examiner

OR RELATING TO POWER TRANSMISSION NETWORKS

TECHNICAL FIELD

This invention relates to a network interconnection, for interconnecting a power supply network with a plurality of power distribution networks, which preferably forms part of a high voltage direct current (HVDC) power transmission network.

BACKGROUND OF THE INVENTION

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power may also be transmitted directly from offshore wind parks to onshore AC power transmission networks.

The conversion between DC power and AC power is utilised where it is necessary to interconnect DC and AC networks. In any such power transmission network, converters (i.e. power converters) are required at each interface between AC and DC power to affect the required conversion from AC to DC or from DC to AC.

SUMMARY OF THE INVENTION

According to an aspect of the invention there is provided a network interconnection, for interconnecting a power supply network with a plurality of power distribution networks, comprising:

a power converter station connected in use adjacent to an end of a power supply network and controllable to provide an alternating voltage source;

an interconnection bus extending from the power converter station towards each of a primary point of interconnection connected in use with a primary power distribution network and at least one secondary point of interconnection the or each of which is connected in use with a corresponding secondary power distribution network;

a power regulator electrically connected between the interconnection bus and the or each secondary point of interconnection, the or each power regulator being operable to control the flow of power from the interconnection bus to the corresponding secondary point of interconnection; and a power flow controller arranged in operative communication with the power converter station and the or each power regulator and programmed to adjust the alternating voltage source provided by the power converter station to control the power delivered to the primary point of interconnection and alter as needed the influence of the or each power regulator to control the power delivered to the or each corresponding secondary point of interconnection.

The provision of such an arrangement, and in particular such a power flow controller, coordinates the control of the power converter station and the or each power regulator and thereby permits, in use, a desired distribution of power received from the power supply network, e.g. a wind park, into the primary power distribution network and the or each secondary power distribution network.

In turn the ability to distribute, as desired, received power into different primary and secondary power distribution networks is beneficial because the intermittent generation of power, e.g. by wind parks or other renewable energy sources, adds a degree of uncertainty to power distribution networks and can cause power delivery congestion problems, both of which can be alleviated by being able to deliver the power into more than one downstream power distribution network.

In addition, it may be intended to sell the power received from the power supply network into more than one power distribution network, as is especially the case in liberalised energy markets, and so the aforementioned ability to control the distribution of power into more than one distribution network is again advantageous.

Preferably the power converter station is or includes a power converter operable to provide a variable voltage source and the power flow controller is programmed to adjust the alternating voltage source provided by the power converter station by establishing a converter voltage magnitude reference that the power converter is required to provide.

Such a power converter station configuration and corresponding action by the power flow controller provides a reliable and readily achievable way of altering the magnitude of the alternating voltage source presented to the primary point of interconnection, and hence a reliable and readily achievable way of altering, in use, the power delivered via such point of interconnection to the primary power distribution network.

Optionally the power flow controller is further programmed to adjust the alternating voltage source provided by the power converter station by establishing a converter voltage angle reference that the power converter station is required to provide.

Establishing a converter voltage angle reference provides for a further degree of control over the power delivered, in use, to each power distribution network.

In a preferred embodiment of the invention the power converter station additionally includes a converter transformer having a primary winding connection which defines a primary part of a virtual interconnection bus that extends towards the primary point of interconnection and at least one secondary winding connection, each of which defines a respective secondary part of the virtual interconnection bus that extends towards a corresponding secondary point of interconnection.

The inclusion of a converter transformer of this type, i.e. with a primary winding connection and at least one secondary winding connection, provides a ready way of accommodating, in use, primary and secondary power distribution networks that are configured to operate at different voltage magnitude levels, while nevertheless retaining the other advantages of the invention, as set out hereinabove.

Optionally at least one secondary winding connection is adjustable.

Having an adjustable secondary winding connection, whereby the difference in voltage magnitude presented to the primary part of the virtual interconnection bus and the or each corresponding secondary part of the virtual interconnection bus can be altered, is advantageous because it provides further flexibility in accommodating any difference in the voltage levels at which the primary and the or each secondary power distribution networks are, in use, configured to operate.

In addition, such an adjustable secondary winding connection can, in use, help to avoid excessive reactive power exchange, i.e. power exchange which results in no net transfer of energy over a complete AC cycle, between the power distribution networks, as well as help to meet a demand for a desired amount of reactive power to be supplied to a respective secondary power distribution network.

Also, the inclusion of the or each adjustable secondary winding connection helps to avoid the need for additional reactive power compensation devices to be installed at the primary and the or each secondary point of interconnection.

The power converter station may include a power converter operable as an inverter and a first adjustable voltage step transformer electrically connected therewith, and the power flow controller may be programmed to adjust the alternating voltage source provided by the power converter station by adjusting the voltage step provided by the first adjustable voltage step transformer.

Such a power converter station configuration and corresponding action by the power flow controller provides another reliable and readily achievable way of altering the magnitude of the alternating voltage source presented to the primary point of interconnection, and hence a reliable and readily achievable way of altering, in use, the power delivered via such point of interconnection to the primary power distribution network.

In another preferred embodiment of the invention at least one power regulator is electrically connected in series with a voltage step transformer.

The inclusion of one or more such a voltage step transformers, i.e. a step-up or step-down transformer, provides another ready means of accommodating, in use, primary and secondary power distribution networks that are configured to operate at different voltage levels, while nevertheless retaining the other advantages of the invention, as set out hereinabove.

Preferably at least one voltage step transformer is or includes a second adjustable voltage step transformer.

Providing a second adjustable voltage step transformer, whereby the degree of voltage step provided by the transformer connected in series with a corresponding power regulator can be altered, is advantageous because it provides further flexibility in accommodating any difference in the voltage magnitude levels at which the primary and secondary power distribution networks are, in use, configured to operate.

In addition, such a second adjustable voltage step transformer can, in use, help avoid excessive reactive power exchange, i.e. power exchange which results in no net transfer of energy over a complete AC cycle, between the primary and secondary power distribution networks, as well as help to meet a demand for a desired amount of reactive power to be supplied to a respective secondary power distribution network.

Also, the inclusion of the or each second adjustable voltage step transformer helps to avoid the need for additional reactive power compensation devices to be installed at the primary and secondary points of interconnection.

In a further preferred embodiment of the invention at least one power regulator is or includes a phase shifter.

Optionally the power flow controller is programmed to alter as needed the influence of the or each phase shifter by sending a respective shift angle reference to the or each phase shifter to manipulate the voltage angle of the alternating voltage source presented by the respective phase shifter to the corresponding secondary point of interconnection.

A phase shifter, such as a phase shifting transformer or a static phase shifting unit, is able, in use, to introduce a difference in the voltage angle at a respective secondary point of interconnection and at a downstream receiving end of the corresponding secondary power distribution network.

Moreover, since the power flow through the said corresponding secondary power distribution network is proportional to the sine of such a difference in voltage angle, manipulation of the voltage angle of the alternating voltage source presented to the respective secondary point of interconnection by the corresponding phase shifter desirably allows control to be exerted over the power flow into and through the said corresponding secondary power distribution network.

In a still further preferred embodiment of the invention the power flow controller is programmed to take into account at least one of an in-use active power demand and an in-use a reactive power demand from at least one of the primary power distribution network and the or each secondary power distribution network when adjusting the alternating voltage source provided by the power converter station and altering as needed the influence of the or each power regulator.

Taking into account an in-use active power demand, i.e. a requirement for power which results in a net transfer of energy over a complete AC cycle, and/or an in-use reactive power demand, i.e. a requirement for power which results in no net transfer of energy over a complete AC cycle, from one or more of the primary power distribution network and the or each secondary power distribution network helps to ensure that the commercial operating requirements of at least one network operator are met, as required.

The power flow controller may be programmed to establish the active power to be delivered via the primary point of interconnection and the or each secondary point of interconnection.

Having a power flow controller that is programmed in this manner provides for flexibility in the manner in which the power received, in use, from the power supply network is distributed as active power, i.e. power which results in a net transfer of energy over a complete AC cycle, between the primary and secondary points of interconnection and hence how, in use, such active power is distributed between the primary and secondary power distribution networks.

For example, the received power may be distributed in a defined ratio of active power, or the distribution may change depending on the time of day. Alternatively a maximum or minimum amount of active power delivered via one point of interconnection or another might be fixed, and any remaining active power is delivered via the or each other point of interconnection.

Preferably the power flow controller is additionally programmed to take into account the respective established active power that is to be delivered to the or each secondary power distribution network when altering the influence of the or each corresponding power regulator.

Optionally the power flow controller is programmed to take into account the respective in-use reactive power demand of the or each secondary power distribution network when establishing the magnitude of an alternating voltage presented to the or each corresponding power regulator by the interconnection bus.

Such programming of the power flow controller establishes the or each secondary point of interconnection, and the or each corresponding secondary power distribution network associated in use therewith, as a respective "load" bus in which one or both of active and reactive power demands are set and met.

The power flow controller may be programmed to adjust the alternating voltage source provided by the power converter station in accordance with the in-use reactive power demand of the primary power distribution network.

Such programming of the power flow controller establishes the primary point of interconnection, and the primary power distribution network associated in use therewith, as a "swing" or "reference" bus which provides a voltage and angular reference for the or each secondary point of interconnection and the or each corresponding secondary power distribution network associated in use therewith.

It will be appreciated that the use of the terms "first" and "second", "primary" and "secondary", and the like, in this patent specification is merely intended to help distinguish between similar features, and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWING

There now follows a brief description of preferred embodiments of the invention, by way of non-limiting example, with reference being made to the following figures in which.

DETAILED DESCRIPTION

Figure 1:
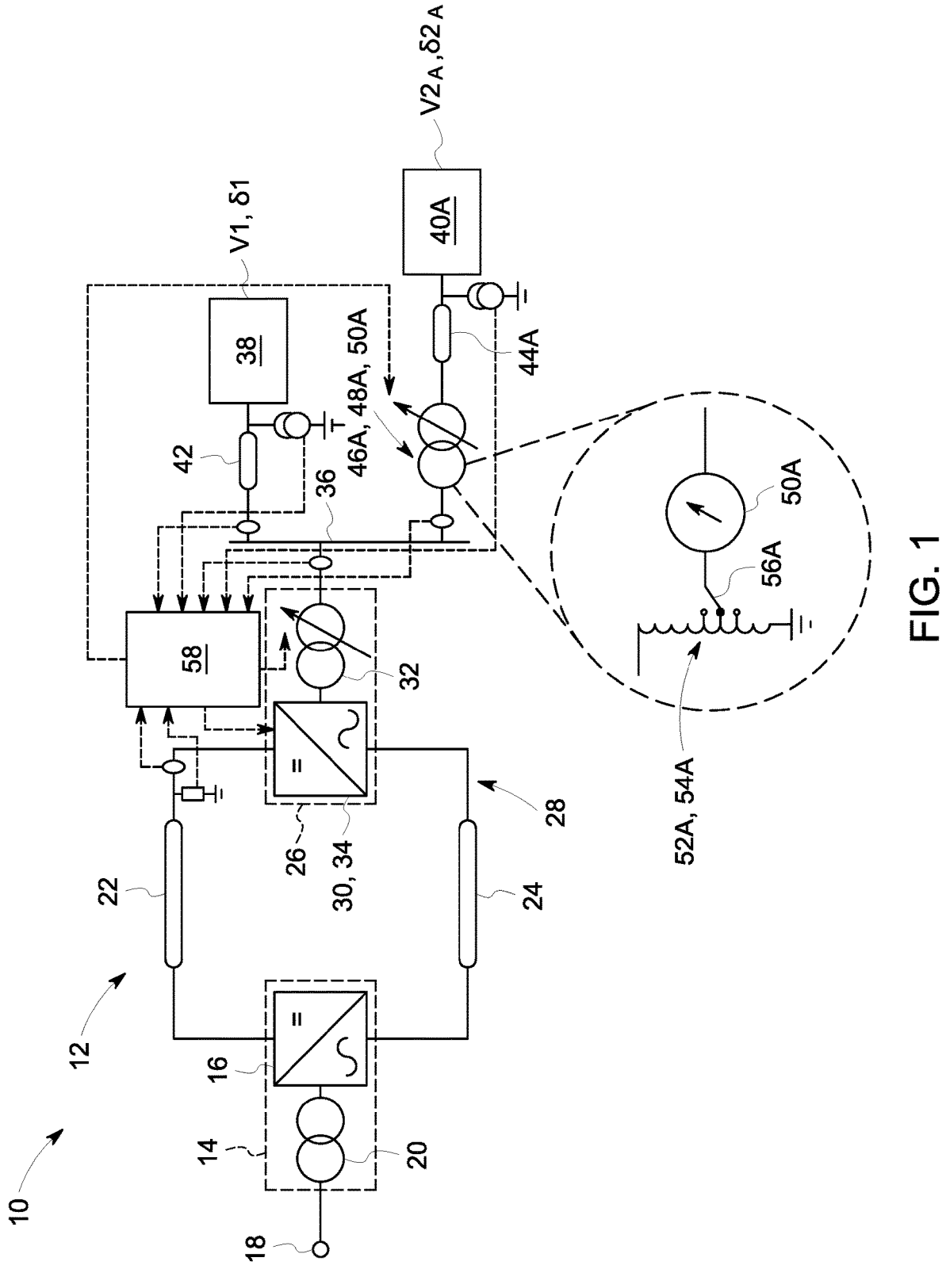
FIG. 1 shows a schematic view of a network interconnection according to a first embodiment of the invention.

A network interconnection according to a first embodiment of the invention is designated generally by reference numeral 10, as shown in FIG. 1.

In use, the first network interconnection 10 interconnects a power supply network 12 with a primary power distribution network and a first secondary power distribution networks (neither of which is shown in FIG. 1).

The power supply network 12 shown in FIG. 1 includes a first power converter station 14 which comprises a first power converter 16 that is operable as a rectifier to convert AC power received from a renewable energy source in the form of a wind park 18, with which the first power converter 16 is electrically coupled via a first converter transformer 20, to DC power. In other embodiments of the invention (not shown) the AC power may be received from another energy source, which may or may not be renewable.

The DC power is, in use, transferred from the first power converter station 14, via first and second DC transmission conduits 22, 24 in the form of undersea cables (although other types of transmission conduit, such as overhead lines, are also possible), to a second power converter station 26 that is connected, in use, adjacent to an end 28, which in the embodiment shown is a receiving end of the power supply network 12.

In other embodiments of the invention (not shown) the configuration of the power supply network may differ.

Returning to the embodiment shown, the second power converter station 26 forms a part of the first network interconnection 10 of the invention, and is controllable to provide an alternating voltage source $V_{conv}$.

More particularly, the second power converter station 26 includes a second power converter 30 and a second converter transformer 32, although the second converter transformer 32 need not always be included. The second power converter 30 is operable to provide a variable voltage source, and more particularly takes the form of a voltage source converter 34.

In this embodiment, the voltage source converter 34 has three converter limbs (not shown) which extend between first and second DC terminals that are connected, in use, to the first and second DC transmission conduits 22, 24. Each converter limb corresponds to a given phase of a three-phase interconnection bus 36 which extends from the second converter transformer 32 of the second power converter station 26. In other embodiments of the invention, the voltage source converter may include fewer than or more than three converter limbs, depending on the number of phases with which the interconnection bus is configured to operate.

Each converter limb includes first and second limb portions which are separated by an AC terminal, that provides the connection, via the second converter transformer 32, to a respective phase of the three-phase interconnection bus 36.

Meanwhile, each limb portion a chain-link converter which includes a plurality of series connected chain-link modules. Each chain-link module includes a number of switching elements that are connected in parallel with an energy storage device in the form of a capacitor. Other types of energy storage device, i.e. any device that is capable of storing and releasing energy to selectively provide a voltage, e.g. a fuel cell or battery, may also be used however. Each switching element includes a semiconductor device, typically in the form of an Insulated Gate Bipolar Transistor (IGBT).

The provision of a plurality of chain-link modules means that it is possible to build up a combined voltage across each chain-link converter, via the insertion of the energy storage devices, i.e. the capacitors, of multiple chain-link modules (with each chain-link module providing its own voltage), which is higher than the voltage available from each individual chain-link module.

Accordingly, each of the chain-link modules work together to permit the chain-link converter to provide a stepped variable voltage source. This permits the generation of a voltage waveform across each chain-link converter using a step-wise approximation. As such each chain-link converter is capable of providing a wide range of complex waveforms.

For example, operation of each chain-link converter in the foregoing manner can be used to generate an AC voltage waveform at each AC terminal, and thereby enable the voltage source converter 34 to provide the aforementioned variable voltage source in order that the second power converter station 26 is able to provide the required alternating voltage source to the interconnection bus 36.

In other embodiments of the invention (not shown) the second power converter station may include a second power converter which is operable as an inverter along with an adjustable voltage step transformer electrically connected therewith. The voltage step adjustment preferably is provided by a tap changer, although this need not necessarily be the case. In any event, the alternating voltage source provided by such a second power converter station can be adjusted by adjusting the voltage step provided by the adjustable voltage step transformer, e.g. by altering the tap changer position.

In such other embodiments, the second power converter may again take the form of a voltage source converter, although the adjustable nature of the voltage step transformer connected therewith negates the need for such a relatively sophisticated power converter, and a simpler power converter merely operable as an inverter would instead suffice.

In still further other embodiments, similar to the foregoing, the second power converter may instead be operable as a rectifier so as to be able to receive power from two separate power supply networks.

Returning to the embodiment shown in FIG. 1, the three-phase interconnection bus 36 extends from the second power converter station 26, i.e. extends from the second converter transformer 32 therewithin, toward each of a primary point of interconnection 38, which, in use, is connected with a primary power distribution network (not shown), and a first secondary point of interconnection 40A, that, in use, is connected with a first secondary power distribution network (again, not shown).

In the example embodiment shown, the primary power distribution network and the first secondary power distribution network are owned and managed by different network operators and are intended to operate at different voltage levels V1, V2$_A$, e.g. the first power distribution network at V1=345 kV and the second power distribution network at V2$_A$=138 kV, although in other embodiments the power distribution networks may be intended to operate at the same voltage level.

Meanwhile, a respective primary AC transmission conduit 42 and first secondary AC transmission conduit 44A may electrically connect the interconnection bus 36 with a corresponding one of the primary and first secondary points of interconnection 38, 40A, although in practice such AC transmission conduits 42, 44A are likely to be very short and so can essentially be ignored for the sake of simplicity.

In addition to the foregoing, the first network interconnection 10 also includes a first power regulator 46A, that is electrically connected between the interconnection bus 36 and the first secondary point of interconnection 40A (and, in the embodiment shown, specifically between the interconnection bus 36 and the first secondary AC transmission conduit 44A, although this need not be the case), and which is operable to control the flow of power from the interconnection bus 36 to the first secondary point of interconnection 40A.

More particularly, the first power regulator 46A is a first phase shifter 48A, and more particularly still a first phase shifting transformer 50A which controls the flow of power from the interconnection bus 36 to the first secondary point of interconnection 40A by manipulating the voltage angle of the alternating voltage source presented, via the interconnection bus 36, to the first secondary point of interconnection 40A.

In other embodiments of the invention (not shown) the first power regulator may be a different form of phase shifter, such as a power electronics based static phase shifting unit. Examples of such static phase shifting units includes a Static Synchronous Series Compensator (SSSC) and a Unified Power Flow Controller (UPFC).

Additionally, the first power regulator 46A, i.e. the first phase shifting transformer 50A, is electrically connected in series with a first voltage step transformer 52A which, as shown in an enlarged portion of FIG. 1, takes the form of a first adjustable voltage step transformer 54A via the incorporation of a first tap changer 56A. Other forms of adjustable voltage step transformer may, however, alternatively be used.

In the particular embodiment shown, the first adjustable voltage step transformer 54A is configured as a step-down transformer so as to accommodate the intended lower operating voltage V2$_A$ of the first secondary power distribution network, i.e. 138 kV, compared to the higher intended operating voltage V1 of the primary power distribution network, i.e. 345 kV. In other embodiments of the invention, however, the adjustable voltage step transformer may instead be configured as a step-up transformer.

Meanwhile, the ability to adjust the actual voltage step down provided, i.e. by altering the position of the first tap changer 56A, provides further flexibility in accommodating the difference in the voltage magnitude levels at which the primary and first secondary power distribution networks are, in use, configured to operate.

As well as the foregoing, the first network interconnection 10 also includes a power flow controller 58 that is arranged in operative communication with the second power converter station 26 and the first power regulator 46A, i.e. the first phase shifting transformer 50A.

In addition, the power flow controller 58 is programmed to adjust the alternating voltage source provided by the second power converter station 26 to control the power delivered to the primary point of interconnection 38, and to alter as needed the influence of the first power regulator 46A, i.e. the first phase shifting transformer 50A, to control the power delivered to the first secondary point of interconnection 40A.

A detailed explanation of one exemplary way in which the power flow controller 58 may be so programmed follows.

The power flow controller 58 is programmed to adjust the alternating voltage source provided by the second power converter station 26 by establishing a converter voltage magnitude reference V$_{conv}$ and a converter voltage angle reference δ that the second power converter 30, i.e. the voltage source converter 34, is required to provide.

Additionally, the power flow controller 58 is programmed to alter as needed the influence of the first phase shifter 48A, i.e. the first phase shifting transformer 50A, by sending a first shift angle reference α$_A$ to the first phase shifting transformer 50A to manipulate the voltage angle of the alternating voltage source presented to the first secondary point of interconnection 40A.

When carrying out each of the aforementioned steps, the power flow controller 58 is programmed to take into account in-use active and reactive power demands P1, Q1 from the primary power distribution network, and in-use active and reactive power demands $P2_A$, $Q2_A$ from the first secondary power distribution network.

Figure 2:
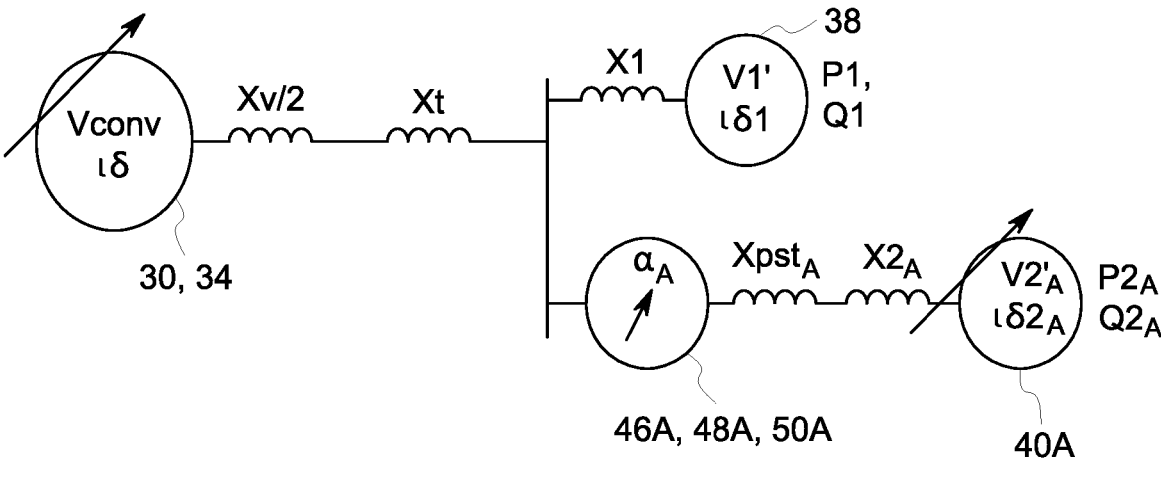
FIG. 2 shows a schematic view of the power flow through the first network interconnection shown in FIG. 1.

One way in which the power flow controller 58 may take into account each of the aforementioned active and reactive power demands P1, Q1, $P2_A$, $Q2_A$ is by considering the active and reactive power flows within the network interconnection 10, as illustrated schematically in FIG. 2.

More particularly, each of the active and reactive power demands P1, Q1, $P2_A$, $Q2_A$ can be expressed in terms of converter voltage magnitude and angle references $V_{conv}$, δ that the power flow controller 58 can require the second power converter 30, i.e. the voltage source converter 34, to provide, along with respective voltage magnitudes and angles V1, $V2_A$, δ1, $δ2_A$ at the primary and first secondary points of interconnection 38, 40A (which represent network parameters at which the primary and first secondary power distribution networks are intended to operate) and the reactances of the various circuit components within the network interconnection 10, i.e.

$$P1 = \frac{|Vconv| * |V1'|}{\left(\frac{Xv'}{2} + Xt' + X1\right)} \sin(\delta - \delta 1)$$

$$Q1 = \frac{|Vconv| * |V1'|}{\left(\frac{Xv'''}{2} + Xt''' + X1\right)} \cos(\delta - \delta 1) - \frac{|V1'|^2}{\left(\frac{Xv'''}{2} + Xt''' + X1\right)}$$

$$P2_A = \frac{|Vconv| * |V2_A'|}{\left(\frac{Xv''}{2} + Xt'' + Xpst + X2_A\right)} \sin(\delta + \alpha_A - \delta 2_A)$$

$$Q2_A = \frac{|Vconv| * |V2_A'|}{\left(\frac{Xv''''}{2} + Xt'''' + Xpst_A + X2_A\right)} \cos(\delta + \alpha_A - \delta 2_A) -$$

$$\frac{|V2_A'|^2}{\left(\frac{Xv''''}{2} + Xt'''' + Xpst_A + X2_A\right)}$$

where,

V1' is the voltage magnitude V1 at the primary point of interconnection 38, i.e. the voltage magnitude of 345 kV at which the primary power distribution network is intended to operate, reflected on the voltage source converter side of the second converter transformer 32;

$V2_A'$ is the voltage magnitude $V2_A$ at the first secondary point of interconnection 40A, i.e. the voltage magnitude of 138 kV at which the first secondary power distribution network is intended to operate, reflected on the voltage source converter side of the second converter transformer 32;

X1 is the reactance at the primary point of interconnection 38;

$X2_A$ is the reactance at the first secondary point of interconnection 40A; and $Xpst_A$ is the reactance of the first phase shifting transformer 50A reflected on the voltage source converter side of the second converter transformer 32, and the relative weighting of the active power demands P1, $P2_A$ and the reactive power demands Q1, $Q2_A$ of the primary and first secondary power distribution networks is taken into account by expressing the reactances of the various circuit components as follows:

$$Xv' = Xv * \left[\frac{(P1 + P2_A)}{P1}\right]$$

$$Xt' = Xt * \left[\frac{(P1 + P2_A)}{P1}\right]$$

$$Xv'' = Xv * \left[\frac{(P1 + P2_A)}{P2_A}\right]$$

$$Xt'' = Xt * \left[\frac{(P1 + P2_A)}{P2_A}\right]$$

$$Xv''' = Xv * \left[\frac{(Q1 + Q2_A)}{Q1}\right]$$

$$Xt''' = Xt * \left[\frac{(Q1 + Q2_A)}{Q1}\right]$$

$$Xv'''' = Xv * \left[\frac{(Q1 + Q2_A)}{Q2_A}\right]$$

$$Xt'''' = Xt * \left[\frac{(Q1 + Q2_A)}{Q2_A}\right]$$

where,

Xt is the reactance of the second converter transformer 32; and

Xv is the reactance of the chain-link converters within the voltage source converter 34.

The power flow controller 58 is also, additionally programmed to establish the active power P1, $P2_A$ to be delivered to the primary and first secondary power distribution networks, via the primary and first secondary points of interconnection 38, 40A, respectively.

One way in which the power flow controller 58 may be so programmed is to evaluate whether the power received from the power supply network 12 is within a maximum active power limit that the primary power distribution network is, in use, configured to accommodate.

If the power received is within the aforesaid limit then all of the received power can be distributed, via the primary point of interconnection 38, as active power P1 to the primary power distribution network, while no active power $P2_A$ is distributed to the first secondary power distribution network.

In contrast, if the power received from the power supply network 12 is greater than the maximum active power limit of the primary power distribution network, e.g. because of a limited capability of the primary power distribution network, then the active power P1 distributed to the primary power distribution network is set at the maximum active power limit that the primary power distribution network and the active power $P2_A$ distributed to the first secondary power distribution network is set at the remaining received power.

In another embodiment of the invention, in circumstances when the total power received from the power supply network cannot be accommodated between the primary and first secondary power distribution networks, i.e. in circumstances where there is an excess of received power, the power flow controller may be programmed to communicate with the first power converter station to reduce the amount of power supplied, e.g. by temporarily throttling or otherwise dissipating the power generated by the wind park.

Once the power flow controller 58 has established the active power P1, $P2_A$ to be delivered, via the respective primary and first secondary points of interconnection 38, 40A, to the primary and first secondary power distribution networks, it is programmed to adjust the alternating voltage source provided by the second power converter 30, i.e. the voltage source converter 34, in accordance with the in-use reactive power demand Q1 of the primary power distribution network.

More particularly, in consideration of the equations set out above relating to the active and reactive power flows within the network interconnection 10, the power flow controller 58 calculates a converter voltage magnitude reference $V_{conv}$ and a converter angle reference $\delta$ that the voltage source converter 34 is required to provide according to:

$$V_{conv} = \frac{Q1*\left(\frac{Xv'''}{2} + Xt''' + X1\right) + \left||V1'|^2\right|}{||V1'|}$$

where Q1 is the reactive power demand of the primary power distribution network, and $$\delta = \sin^{-1}\left[\frac{P1*\left(\frac{Xv'}{2} + Xt' + X1\right)}{|Vconv|*||V1'|}\right] + \delta 1$$

which allows the above to be modified to give the following $$V_{conv} = \frac{Q1*\left(\frac{Xv'''}{2} + Xt''' + X1\right) + \left||V1'|^2\right|}{||V1'|\cos(\delta - \delta 1)}$$

and thereby permits an iterative solution for the converter voltage magnitude reference $V_{conv}$ and the voltage angle reference $\delta$ to be calculated, assuming that the voltage angle $\delta 1$ at the primary point of interconnection 38 is zero.

Utilising an iterative process, e.g. such as might be implemented in a closed loop fashion, to determine the extent to which the alternating voltage source provided by the voltage source converter 34 should be adjusted, i.e. by setting a different converter voltage magnitude reference $V_{conv}$, is advantageous because it leads to a converged power flow solution for the distribution of power to the first and second power distribution networks.

When the voltage levels at which the primary and first secondary power distribution networks operate differ, as is the case in the illustrated embodiment shown in FIGS. 1 and 2, the power flow controller 58 is programmed to take into account the in-use reactive power demand $Q2_A$ of the first secondary power distribution network when establishing the magnitude of an alternating voltage presented to the first power regulator 46A by the interconnection bus 36.

One way in which the power flow controller 58 can take such an in-use reactive power demand $Q2_A$ into account is by satisfying the following $$|V2'_A|^2 - |V2'_A||Vconv|\cos(\delta - \delta 2_A + \alpha_A 0) +$$
$$Q2_A*\left(\left(\frac{Xv''}{2} + Xt'' + Xpst_A + X2_A\right)\right) = 0$$

where,
  $V2_A'$ is the voltage magnitude $V2_A$ at the first secondary point of interconnection 40A, i.e. the voltage magnitude of 138 kV at which the first secondary power distribution network is intended to operate, reflected on the voltage source converter side of the second converter transformer 32; and

12

$\alpha_A 0$ is an initial phase angle reference of the first power regulator 46A, i.e. the first phase shifting transformer 50A.

From the calculated reflected voltage $V2_A'$ it is then possible to determine the voltage step needed at the first adjustable voltage step down transformer 54A, and hence the position of the associated first tap changer 56A can be determined from the following $$\% \text{ Tap} = \left[\frac{TurnRatio_{needed}}{TurnRatio_{nom}} + 1\right]*100$$

$$TurnRatio_{needed} = \frac{|V2_A|}{|V2'_A|}$$

$$TurnRatio_{nom} = \frac{|V2_{A_{nom}}|}{\left|V2'_{A_{nominalvalvewinding}}\right|}$$

where,
  $V2'_{A_{nominalvalvewinding}}$ is the voltage reflected on the voltage source converter side of the second converter transformer 32, when the first adjustable voltage step transformer 54A, i.e. the first tap changer 56A thereof, is at a zero tap position and the voltage magnitude $V2_A$ at the first secondary point of interconnection 40A, i.e. the intended in-use voltage magnitude of the first secondary power distribution network, is at a nominal value $V2_{A_{nom}}$.

The power flow controller 58 is programmed to then take into account the established active power $P2_A$ that is to be delivered to the first secondary power distribution network when altering the influence of the first power regulator 46A, i.e. the first phase shifting transformer 50A.

More particularly, the power flow controller 58 calculates a first shift angle reference $\alpha_A$ for sending to the first phase shifting transformer 50A according to $$\alpha_A = \sin^{-1}\left[\frac{P2_A*\left(\frac{Xv''}{2} + Xt'' + Xpst_A + X2_A\right)}{|Vconv|*|V2'_A|}\right] + (\delta - \delta 2_A)$$

where,
  $Xpst_A$ is the reactance of the first phase shifting transformer 50A reflected on the voltage source converter side of the second converter transformer 32, which generally is a function of the position of the first tap changer 56A in the first adjustable voltage step transformer 54A.

As a consequence, $$\% \text{ Tap} = \left[\frac{TurnRatio_{needed}}{TurnRatio_{nom}} + 1\right]*100$$

and $$\alpha_A = \sin^{-1}\left[\frac{P2_A*\left(\frac{Xv''}{2} + Xt'' + Xpst_A + X2_A\right)}{|Vconv|*|V2'_A|}\right] + (\delta - \delta 2_A)$$

are solved together using an iterative process, which again helps achieve a converged power flow solution for the distribution of power to the primary and first secondary power distribution networks.

The power flow controller 58 preferably is additionally programmed to check that the voltage magnitudes V1, V2$_A$ presented to the primary and first secondary points of interconnection 38, 40A, i.e. the respective voltage levels at which the primary and first secondary power distribution networks are intended to operate, as well as the requirements expected of the voltage source converter 34, i.e. the calculated converter voltage magnitude reference V$_{conv}$ and voltage angle reference $\delta$ are within predetermined design limits. If these quantities are not within such predetermined design limits then the power flow controller 58 preferably imposes limits on the active and reactive power P1, Q1, P2$_A$, Q2$_A$ distributed to one or both of the primary and first secondary power distribution networks.

Figure 3:
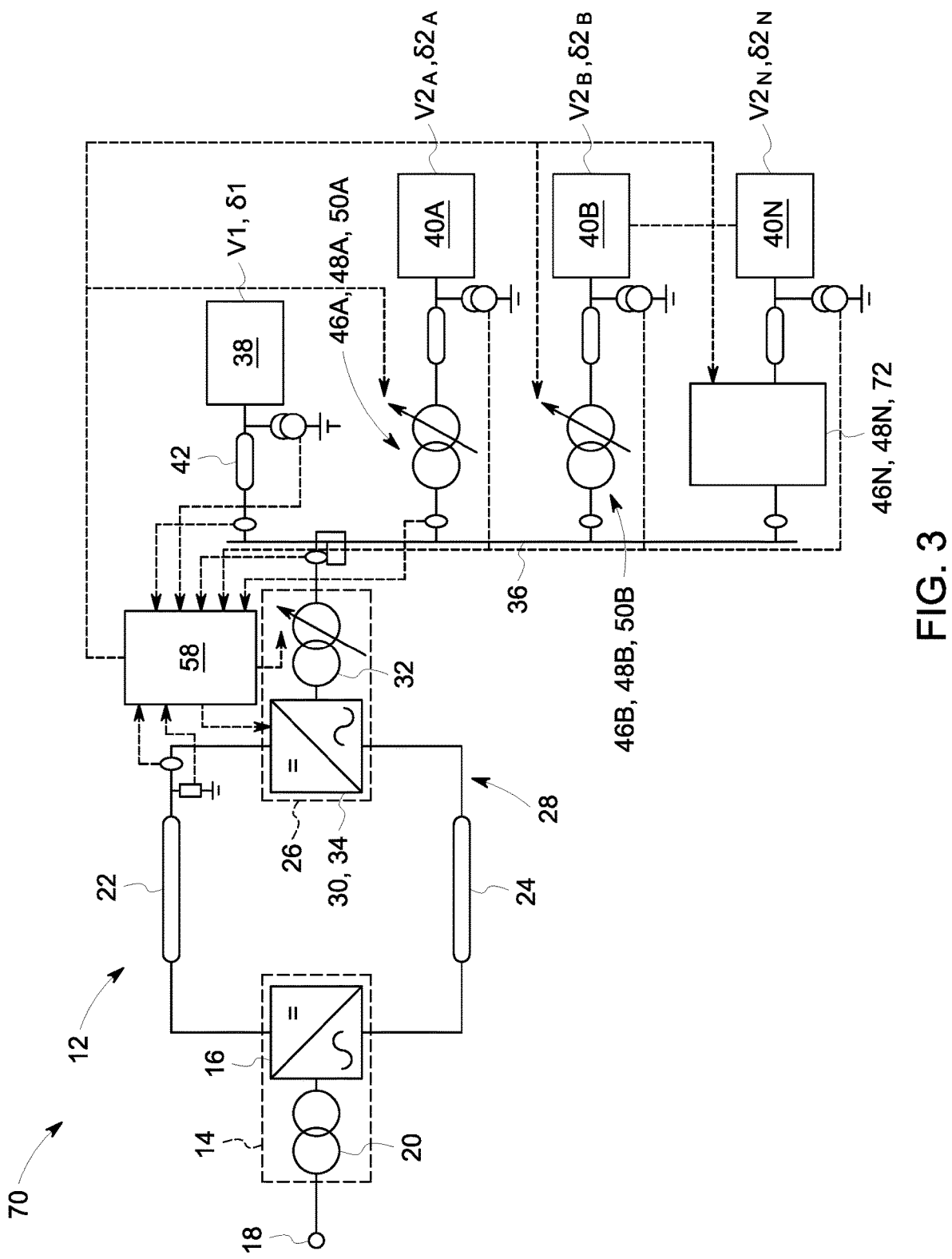
FIG. 3 shows a schematic view of a network interconnection according to a second embodiment of the invention.

A network interconnection according to a second embodiment of the invention is designated generally by reference numeral 70, as shown in FIG. 3.

The second network interconnection 70 is similar to the first network interconnection and like features share the same reference numerals.

One way in which the second network interconnection 70 differs, however, from the first network interconnection 10 is that the second network interconnection 70 interconnects a power supply network 12 with a primary power distribution network and first, second and further secondary power distribution networks (none of which is shown in FIG. 3).

More particularly, in the embodiment shown in FIG. 3, the three-phase interconnection bus 36 extends from the second power converter station 26, i.e. extends from the second converter transformer 32 therewithin, toward each of a primary point of interconnection 38, which, in use, is connected with the primary power distribution network, a first secondary point of interconnection 40A that, in use, is connected with the first secondary power distribution network, a second secondary point of interconnection 40B which, in use, is connected with the second secondary power distribution network, and a further secondary point of interconnection 40N which, in use, is connection with the further secondary power distribution network.

The inclusion, in the example embodiment shown, of a further secondary point of interconnection 40N is intended to illustrate that other embodiments of the invention may be configured to distribute power to a downstream primary power distribution network and any number of, i.e. N, secondary power distribution networks.

In the example embodiment shown, the primary power distribution network and any number of the secondary power distribution networks may again be owned and managed by different network operators, such that they are intended to operate at different voltage levels V1, V2$_A$, V2$_B$, V2$_N$ etc., although again in still further embodiments the primary and multiple secondary power distribution networks may be intended to operate at the same voltage level.

Meanwhile, respective first, second and further secondary AC transmission conduits 44A, 44B, 44N may electrically connect the interconnection bus 36 with a corresponding one of the first, second and further secondary points of interconnection 40A, 40B, 40N although in practice such AC transmission conduits 40A, 40B, 40N are again likely to be very short and so can essentially be ignored for the sake of simplicity.

In addition, the second network interconnection 70 also includes a respective power regulator 46A, 46B, 46N that is electrically connected between the interconnection bus 36 and each of the first, second and further secondary points of interconnection 40A, 40B, 40N (and, in the embodiment shown, specifically between the interconnection bus 36 and the corresponding first, second or further secondary AC transmission conduit 44A, 44B, 44N although this need not be the case). Each such respective power regulator 46A, 46B, 46N is operable to control the flow of power from the interconnection bus 36 to the corresponding first, second or further secondary point of interconnection 40A, 40B, 40N.

More particularly, the first power regulator 46A is again a first phase shifter 48A, and more particularly still a first phase shifting transformer 50A which controls the flow of power from the interconnection bus 36 to the first secondary point of interconnection 40A by manipulating the voltage angle of the alternating voltage source presented, via the interconnection bus 36, to the first secondary point of interconnection 40A.

A second power regulator 46B is similarly a second phase shifter 48B in the form of a second phase shifting transformer 50B, while the further power regulator 46N is a further phase shifter 48N in the form of a power electronics based static phase shifting unit, and in particular a Static Synchronous Series Compensator 72.

In other embodiments of the invention (not shown) any of the various power regulators may be a phase shifting transformer or a different form of phase shifter, such as a power electronics based static phase shifting unit, e.g. the aforesaid Static Synchronous Series Compensator or a Unified Power Flow Controller.

Additionally, each of the first and second power regulators 46A, 46B, i.e. the first and second phase shifting transformers 50A, 50B is electrically connected in series with a first voltage step transformer (not shown), each of which takes the form of a first adjustable voltage step transformer via the incorporation of a first tap changer. Other forms of adjustable voltage step transformer may, however, alternatively be used, or no adjustment be provided.

The second network interconnection 70 again also includes a power flow controller 58 that is arranged in operative communication with the second power converter station 26 and each of the first, second and further power regulators 46A, 46B, 46N i.e. each of the first and second phase shifting transformers 50A, 50B and the static synchronous series compensator 72.

The power flow controller 58 in the second network interconnection 70 is similarly programmed to adjust the alternating voltage source provided by the second power converter station 26 to control the power delivered to the primary point of interconnection 38, and to alter as needed the influence of the first, second and further power regulators 46A, 46B, 46N i.e. the first and second phase shifting transformers 50A, 50B and the static synchronous series compensator 72 to control the power delivered to each corresponding first, second and further secondary point of interconnection 40A, 40B, 40N.

The power flow controller 58 is again programmed to adjust the alternating voltage source provided by the second power converter station 26 by establishing a converter voltage magnitude reference V$_{conv}$ and a converter voltage angle reference $\delta$ that the second power converter 30, i.e. the voltage source converter 34, is required to provide. Additionally, the power flow controller 58 is programmed to alter as needed the influence of each the first, second and further phase shifters 48A, 48B, 46N, i.e. each of the first and second phase shifting transformers 50A, 50B, and the static synchronous series compensator 72, by sending a respective first, second and further shift angle reference $\alpha_A$, $\alpha_B$, $\alpha_N$ to the corresponding first phase shifting transformer 50A, second phase shifting transformer 50B, or static synchronous series compensator 72 to manipulate the voltage angle of the alternating voltage source presented to the corresponding first, second and further secondary point of interconnection 40A, 40B, 40N.

When carrying out each of the aforementioned steps, the power flow controller 58 is programmed to take into account in-use active and reactive power demands P1, Q1 from the primary power distribution network, and corresponding in-use active and reactive power demands $P2_A$, $Q2_A$, $P2_B$, $Q2_B$, $P2_N$, $Q2_N$ from each of the first, second and further secondary power distribution networks.

Figure 4:
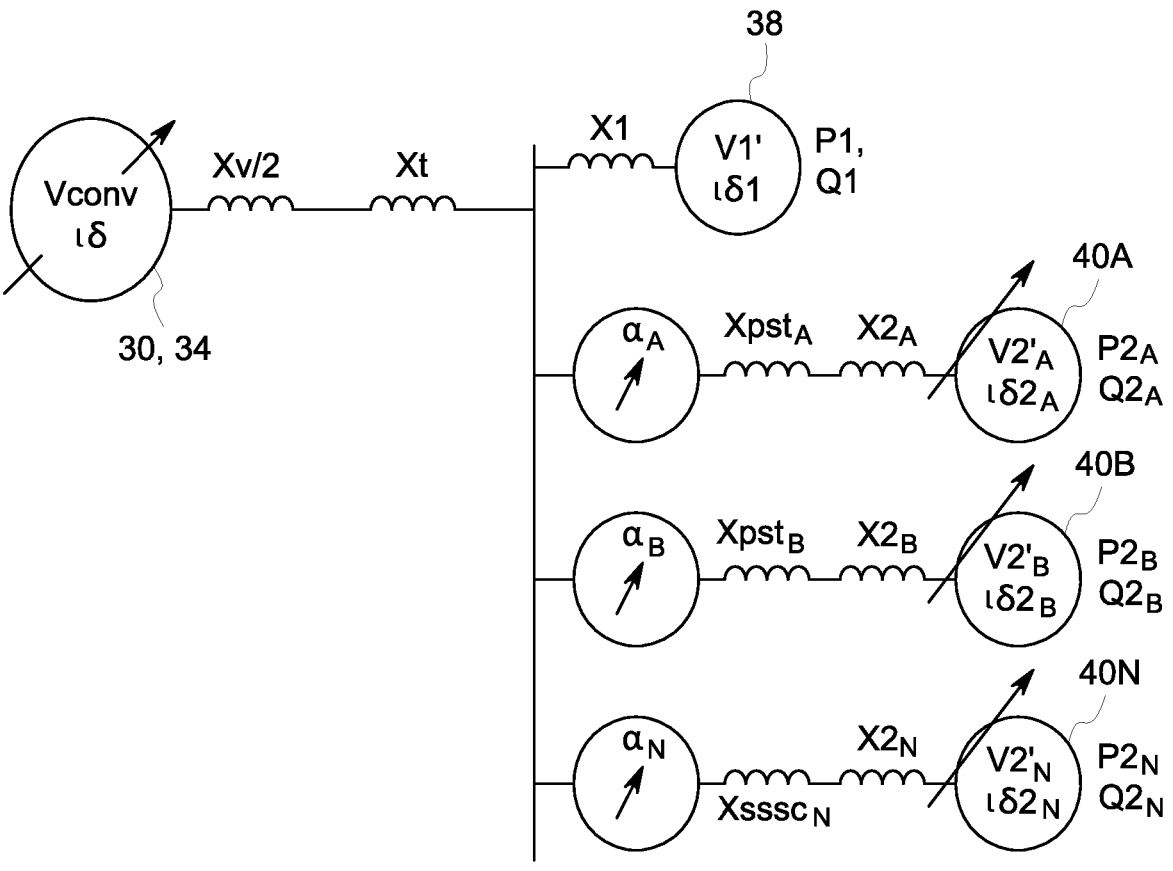
FIG. 4 shows a schematic view of the power flow through the second network interconnection shown in FIG. 3.

One way in which such a power flow controller 58 may take into account each of the aforementioned active and reactive power demands P1, Q1, $P2_A$, $Q2_A$, $P2_B$, $Q2_B$, $P2_N$, $Q2_N$ is again by considering the active and reactive power flows within the second network interconnection 70, as illustrated schematically in FIG. 4 in which, V1' is the voltage magnitude V1 at the primary point of interconnection 38, i.e. the voltage magnitude at which the primary power distribution network is intended to operate, reflected on the voltage source converter side of the second converter transformer 32;

$V2_A$' is the voltage magnitude $V2_A$ at the first secondary point of interconnection 40A, i.e. the voltage magnitude at which the first secondary power distribution network is intended to operate, reflected on the voltage source converter side of the second converter transformer 32;

$V2_B$' is the voltage magnitude $V2_B$ at the second secondary point of interconnection 40B, i.e. the voltage magnitude at which the second secondary power distribution network is intended to operate, reflected on the voltage source converter side of the second converter transformer 32;

$V2_N$' is the voltage magnitude $V2_N$ at the further secondary point of interconnection 40N, i.e. the voltage magnitude at which the further secondary power distribution network is intended to operate, reflected on the voltage source converter side of the second converter transformer 32;

δ1 is the voltage angle at the primary points of interconnection 38, i.e. the voltage angle at which the primary power distribution network is intended to operate;

$δ2_A$ is the voltage angle at the first secondary point of interconnection 40A, i.e. the voltage angle at which the first secondary power distribution network is intended to operate;

$δ2_B$ is the voltage angle at the second secondary point of interconnection 40B, i.e. the voltage angle at which the second secondary power distribution network is intended to operate;

$δ2_N$ is the voltage angle at the further secondary point of interconnection 40N, i.e. the voltage angle at which the further secondary power distribution network is intended to operate;

Xt is the reactance of the second converter transformer 32;

Xv is the reactance of the chain-link converters within the voltage source converter 34;

X1 is the reactance at the primary point of interconnection 38;

$X2_A$ is the reactance at the first secondary point of interconnection 40A;

$X2_B$ is the reactance at the second secondary point of interconnection 40B;

$X2_N$ is the reactance at the further secondary point of interconnection 40N;

$Xpst_A$ is the reactance of the first phase shifting transformer 50A reflected on the voltage source converter side of the second converter transformer 32;

$Xpst_B$ is the reactance of the second phase shifting transformer 50B reflected on the voltage source converter side of the second converter transformer 32; and $Xsssc_N$ is the equivalent reactance of the static synchronous series compensator 72 reflected on the voltage source converter side of the second converter transformer 32.

Thereafter, the power flow controller 58 within the second network interconnection 70 calculates a converter voltage magnitude reference $V_{conv}$ and a converter angle reference δ that the voltage source converter 34 is required to provide, as well as respective first, second and further shift angle references $α_A$, $α_B$, $α_N$ for sending to the corresponding first, second and further power regulators 46A, 46B and 46N, in a similar iterative manner to that set out above in relation to the first network interconnection 10.

Figure 5:
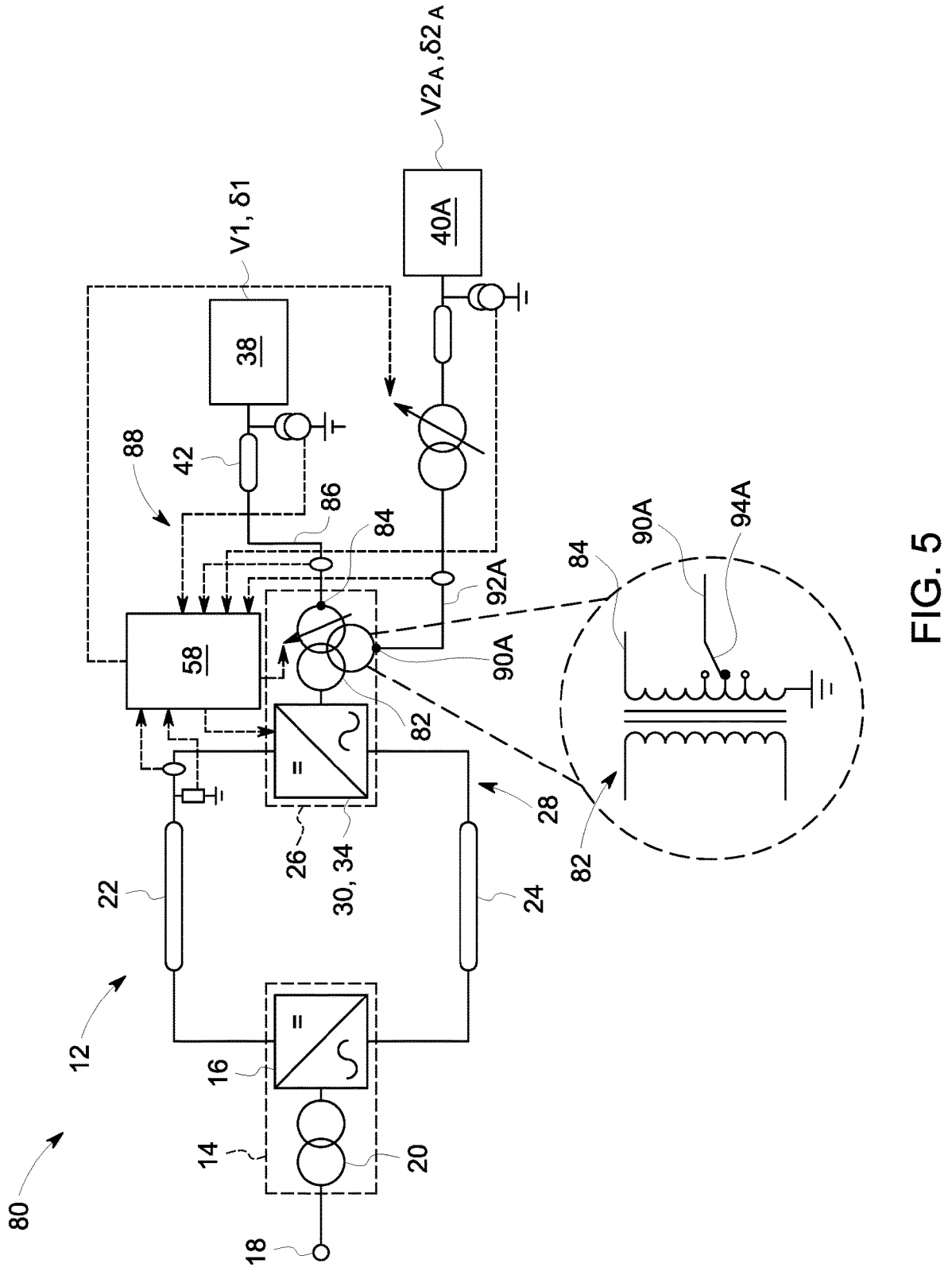
FIG. 5 shows a schematic view of a network interconnection according to a third embodiment of the invention.

A network interconnection according to a third embodiment of the invention is designated generally by reference numeral 80, as shown in FIG. 5.

The third network interconnection 80 is again similar to the first network interconnection 10 and like features share the same reference numerals.

One way in which the third network interconnection 80 differs, however, from the first network interconnection 10 is that in the third network interconnection 80 the second power converter station 26 includes a second power converter 30 in the form of a voltage source converter 34, but this is instead electrically connected with a third converter transformer 82.

The third converter transformer 82 has a primary winding connection 84 which defines a primary part 86 of a virtual interconnection bus 88 that extends towards the primary point of interconnection 38, and a first secondary winding connection 90A which defines a first secondary part 92A of the virtual interconnection bus 88 that extends towards the first secondary point of interconnection 40A.

More particularly, the primary part 86 of the virtual interconnection bus 88 is electrically connected to the primary point of interconnection 38 by a primary AC transmission conduit 42, although this need not necessarily be the case, and the first secondary part 92A is electrically connected to a first power regulator 46A in the form of a first phase shifting transformer 50A, although another type of phase shifter could instead be used. The first phase shifting transformer 50A is, in turn, electrically connected to the first secondary point of interconnection 40A by a first secondary AC transmission conduit 44A, although again this need not necessarily be the case.

The primary and first secondary winding connections 84, 90A are selected so as to present desired voltage magnitudes V1, $V2_A$ to the primary and first secondary points of interconnection 38, 40A according to the respective voltage levels, e.g. V1=345 KV and $V2_A$=138 kV, at which the primary and first secondary power distribution networks are intended to operate.

In addition, as shown in an enlarged portion of FIG. 5, the first secondary winding connection 90A of the third converter transformer 82 is adjustable by way of the incorporation of a second tap changer 94A, although other forms of adjustment are possible, and the first secondary winding connection 90A need not be adjustable in other embodiments of the invention. Such an adjustable first secondary winding connection 90A provides further flexibility in accommodating different operating voltage levels V1, $V2_A$ of the primary and first secondary power distribution networks, as well as helping to avoid excessive reactive power exchange between the primary and first secondary points of interconnection 38, 40A and the need for additional reactive power compensation devices to be installed at the different points of interconnection 38, 40A.

In other embodiments of the invention (not shown) the primary winding connection may instead be adjustable, or both the primary and first secondary winding connections may be adjustable. Such adjustable winding connections carry with them similar benefits to those mentioned above, i.e. further flexibility in accommodating different operating voltage levels and in relation to managing reactive power.

Still further embodiments of the invention (also not shown) may additionally include one or more further secondary winding connections, each of which extends from the second power converter station, i.e. each of which extends from the second converter transformer therewithin, towards a corresponding further secondary point of interconnection which, in use, is connected with a corresponding further secondary power distribution network. One or more of such further secondary winding connections may be adjustable, e.g. via the inclusion of a further second tap changer.

Meanwhile, the power flow controller 58 within the third network interconnection 80 is programmed to operate in essentially the same manner as the power flow controller 58 in the first network interconnection 10, save for the fact that the power flow controller 58 in the third network interconnection 80 deals with a second tap changer 94A within the third converter transformer 82 rather than a first tap changer 56A within the first adjustable step transformer 54A associated with the first phase shifting transformer 50A in the first network interconnection 10.

Figure 6:
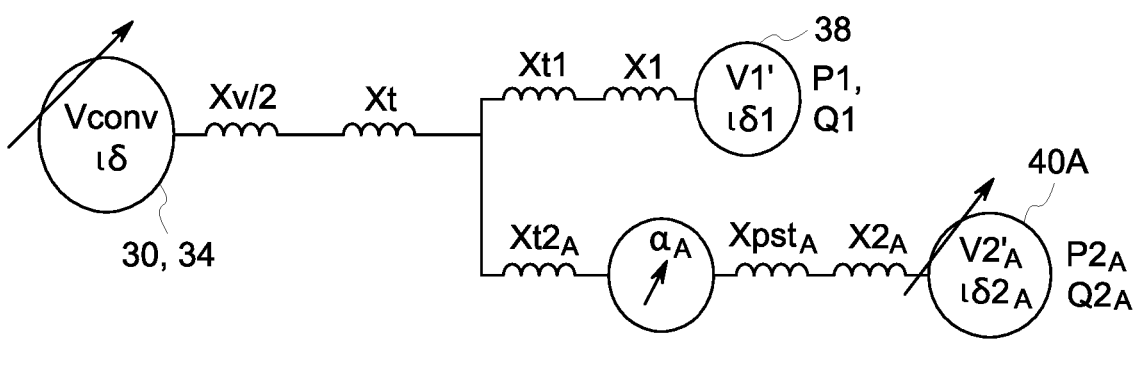
FIG. 6 shows a schematic view of the power flow through the third network interconnection shown in FIG. 5.

It follows that the power flow controller 58 in the third network interconnection 80 again takes into account each of the active and reactive power demands P1, Q1, $P2_A$, $Q2_A$ of the associated primary and first secondary power transfer networks by considering the slightly modified active and reactive power flows through the network interconnection 80, as illustrated schematically in FIG. 6, where Xt1' is the reactance of the windings of the third converter transformer 82 associated with the primary point of interconnection 38, i.e. as determined by the position of the primary winding connection 84, reflected on the voltage source converter side of the third converter transformer 82; and $Xt2_A$' is the reactance of the windings of the third converter transformer 82 associated with the first secondary point of interconnection 40A, i.e. as determined by the position of the first secondary winding connection 90A, reflected on the voltage source converter side of the third converter transformer 82 (which is zero based on the third converter transformer 82 shown schematically in FIG. 5).

Accordingly the said power flow controller 58 in the third network interconnection 80, when adjusting the alternating voltage source provided by the second power converter 30, i.e. the voltage source converter 34, in accordance with the in-use reactive power demand Q1 of the primary power distribution network, takes into account the reactance Xt1' associated with the primary winding connection 84 when calculating the converter voltage magnitude reference $V_{conv}$ and converter angle reference δ that the voltage source converter 34 is required to provide, by modifying the constants in the following equations, i.e.

$$\delta = \sin^{-1}\left[\frac{P1*\left(\frac{Xv'}{2} + Xt' + X1\right)}{|Vconv|*||V1'|}\right] + \delta1$$

instead becomes $$\delta = \sin^{-1}\left[\frac{P1*\left(\frac{Xv'}{2} + Xt' + (Xt1' + X1)\right)}{|Vconv|*||V1'|}\right] + \delta1$$

and $$Vconv = \frac{Q1*\left(\frac{Xv'''}{2} + Xt''' + X1\right) + \left|\,|V1'|^2\right.}{||V1'|\cos(\delta - \delta1)}$$

becomes $$Vconv = \frac{Q1*\left(\frac{Xv'''}{2} + Xt''' + (Xt1' + X1)\right) + \left|\,|V1'|^2\right.}{||V1'|\cos(\delta - \delta1)}$$

An iterative solution for the converter voltage magnitude reference $V_{conv}$ and the voltage angle reference δ can again be calculated.

We claim:

1. A network interconnection, for interconnecting a power supply network with a plurality of power distribution networks, comprising:

a power converter station arranged to be connected to an end of a power supply network and controllable to provide an alternating voltage source;

an interconnection bus extending from the power converter station towards each of a primary point of interconnection connected in use with a primary power distribution network and at least one secondary point of interconnection each of which is connected in use with a corresponding secondary power distribution network;

a power regulator electrically connected between the interconnection bus and each secondary point of interconnection, each power regulator being operable to control a flow of power from the interconnection bus to the corresponding secondary point of interconnection, wherein at least one power regulator is or includes a phase shifter; and a power flow controller arranged in operative communication with the power converter station and each power regulator and programmed to adjust the alternating voltage source provided by the power converter station to control the power delivered to the primary point of interconnection and alter as needed the influence of each power regulator to control the power delivered to each corresponding secondary point of interconnection, wherein the power flow controller is programmed to alter as needed the influence of each phase shifter by sending a respective shift angle reference to each phase shifter to manipulate the voltage angle of the alternating voltage source presented by the respective phase shifter to the corresponding secondary point of interconnection.

2. The network interconnection according to claim 1, wherein the power converter station is or includes a power converter operable to provide a variable voltage source and the power flow controller is programmed to adjust the alternating voltage source provided by the power converter station by establishing a converter voltage magnitude reference that the power converter is required to provide.

3. The network interconnection according to claim 2, wherein the power flow controller is further programmed to adjust the alternating voltage source provided by the power converter station by establishing a converter voltage angle reference that the power converter station is required to provide.

4. The network interconnection according to claim 2, wherein the power converter station additionally includes a converter transformer having a primary winding connection which defines a primary part of a virtual interconnection bus that extends towards the primary point of interconnection and at least one secondary winding connection, each of which defines a respective secondary part of the virtual interconnection bus that extends towards a corresponding secondary point of interconnection.

5. The network interconnection according to claim 4, wherein at least one secondary winding connection is adjustable.

6. The network interconnection according to claim 1, wherein the power converter station includes a power converter operable as an inverter and a first adjustable voltage step transformer electrically connected therewith, and the power flow controller is programmed to adjust the alternating voltage source provided by the power converter station by adjusting the voltage step provided by the first adjustable voltage step transformer.

7. The network interconnection according to claim 2, wherein at least one power regulator is electrically connected in series with a voltage step transformer.

8. The network interconnection according to claim 7, wherein at least one voltage step transformer is or includes a second adjustable voltage step transformer.

9. The network interconnection according to claim 1, wherein the power flow controller is programmed to take into account at least one of an in-use active power demand and an in-use a reactive power demand from at least one of the primary power distribution network and each secondary power distribution network when adjusting the alternating voltage source provided by the power converter station and altering as needed the influence of each power regulator.

10. The network interconnection according to claim 9, wherein the power flow controller is programmed to establish the active power to be delivered via the primary point of interconnection and each secondary point of interconnection.

11. The network interconnection according to claim 10, wherein the power flow controller is additionally programmed to take into account a respective established active power that is to be delivered to each secondary power distribution network when altering the influence of each corresponding power regulator.

12. The network interconnection according to claim 10, wherein the power flow controller is programmed to take into account the respective in-use reactive power demand of each secondary power distribution network when establishing the magnitude of an alternating voltage presented to each corresponding power regulator by the interconnection bus.

13. The network interconnection according to claim 9, wherein the power flow controller is programmed to adjust the alternating voltage source provided by the power converter station in accordance with the in-use reactive power demand of the primary power distribution network.

* * * * *